(12) United States Patent
Xiong et al.

(10) Patent No.: US 10,341,968 B2
(45) Date of Patent: Jul. 2, 2019

(54) RESOURCE ALLOCATION AND UE BEHAVIOR FOR D2D SYNCHRONIZATION SIGNAL TRANSMISSION FOR INTER-CELL D2D DISCOVERY

(71) Applicant: INTEL IP CORPORATION, Santa Clara, CA (US)

(72) Inventors: Gang Xiong, Portland, OR (US); Debdeep Chatterjee, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/407,604

(22) PCT Filed: Jun. 23, 2015

(86) PCT No.: PCT/US2015/037170
§ 371 (c)(1),
(2) Date: Jan. 17, 2017

(87) PCT Pub. No.: WO2016/022219
PCT Pub. Date: Feb. 11, 2016

(65) Prior Publication Data
US 2017/0188320 A1 Jun. 29, 2017

Related U.S. Application Data

(60) Provisional application No. 62/034,614, filed on Aug. 7, 2014.

(51) Int. Cl.
*H04W 40/24* (2009.01)
*H04W 56/00* (2009.01)
(Continued)

(52) U.S. Cl.
CPC .......... *H04W 56/001* (2013.01); *H04L 41/08* (2013.01); *H04W 8/005* (2013.01);
(Continued)

(58) Field of Classification Search
None
See application file for complete search history.

(56) References Cited

U.S. PATENT DOCUMENTS

| | | |
|---|---|---|
| 2010/0165882 A1 | 7/2010 | Palanki et al. |
| 2014/0056220 A1* | 2/2014 | Poitau .................. H04W 76/14 370/328 |

(Continued)

FOREIGN PATENT DOCUMENTS

WO 2014113537 A1 7/2014

OTHER PUBLICATIONS

U.S. Appl. No. 62/033,798, filed Aug. 6, 2014 (Year: 2014).*

(Continued)

*Primary Examiner* — Sithu Ko
(74) *Attorney, Agent, or Firm* — Thorpe North & Western

(57) ABSTRACT

Technology to improve resource allocation for inter-cell device-to-device (D2D) discovery and timing synchronization between user equipments (UEs) connected to asynchronous network deployments is disclosed. Also, transmission rules are provided for networks wherein discovery-resource pools are allocated in a frequency-division-multiplexing (FDM) manner. In the first sub-frame of a transmission-resource pool, there may be overlap between resources that are allocated for a discovery-resource pool and resources that are allocated for D2D synchronization signals (D2DSSs). Non-overlapping PRBs in the discovery-resource pool can be allocated for WAN transmission or D2D-discovery transmission. In scenarios where discovery-resource pools are allocated using FDM, a measurement (Continued)

such as reference signal received power (RSRP) or path loss can be made for a UE. The measurement can be compared to a threshold value to determine whether the UE will transmit a D2DSS.

18 Claims, 8 Drawing Sheets

(51) Int. Cl.
  *H04W 72/04* (2009.01)
  *H04L 12/24* (2006.01)
  *H04W 8/00* (2009.01)
  *H04W 72/12* (2009.01)
  *H04W 88/02* (2009.01)

(52) U.S. Cl.
  CPC ..... *H04W 72/044* (2013.01); *H04W 72/0453* (2013.01); *H04W 72/12* (2013.01); *H04W 88/02* (2013.01)

(56) References Cited

U.S. PATENT DOCUMENTS

| | | | | |
|---|---|---|---|---|
| 2014/0328329 | A1* | 11/2014 | Novlan | H04W 72/042 370/336 |
| 2014/0376458 | A1* | 12/2014 | Ryu | H04W 72/085 370/329 |
| 2015/0009875 | A1 | 1/2015 | Khoryaev et al. | |
| 2015/0215903 | A1* | 7/2015 | Zhao | H04W 72/04 370/329 |
| 2016/0044619 | A1* | 2/2016 | Ryu | H04W 76/14 370/350 |
| 2016/0135200 | A1* | 5/2016 | Brahmi | H04W 4/06 370/329 |
| 2016/0183276 | A1* | 6/2016 | Marinier | H04W 72/02 370/329 |

OTHER PUBLICATIONS

U.S. Appl. No. 61/990,046, filed May 7, 2014 (Year: 2014).*
3GPP TSG RAN WG1 Meeting #77; RAN1 Chairman's Notes; Seoul, Korea; May 19-23, 2014.
3GPP TSG RAN WG1 Meeting #76; R1-140825; On the Resource Pool Configuration for D2D Communications; Prague, Czech Republic; Feb. 10-14, 2014.
3GPP TSG RAN WG1 Meeting #77; R1-142409; Synchronization Signals and Channel Design for D2D; Seoul, Korea; May 19-23, 2014.
3GPP TSG RAN WG1 Meeting #76bis; RAN1 Chairman's Notes; Shenzhen, China; Mar. 31 through Apr. 4, 2014.
3GPP TSG RAN WG1 Meeting #76; RAN1 Chairman's Notes; Prague, Czech Republic, Feb. 10-14, 2014.
ISR for PCT/US2015/037170; Applicant's Ref. #P71235PCT; Int'l filing date Jun. 23, 2015; ISR dated Sep. 10, 2015.
Ericsson; "Broadcast of ProSe Control Information and Related Procedures"; 3GPP TSG Tdoc R2-142604; (May 19-23, 2014); 6 pages; RAN WG2 #86, Seoul, Republic of Korea; (Agenda 7.4.2.2).
Ericsson; "Frame Structure for D2D-Enabled LTE Carriers"; 3GPP TSG R1-142408; (May 19-23, 2014); 4 pages; RAN WG1 Meeting #77, Seoul, Korea; (Agenda 6.2.5.2).
Nokia, NSN; "D2D synchronization and transmission timing"; 3GPP TSG R1-135591; (Nov. 11-15, 2013); 5 pages; RAN WG1 Meeting #75, San Francisco, USA; (Agenda 6.2.8.1.1).
Zte; "Resource Allocation for Type 1 Discovery"; 3GPP TSG R1-142231; (May 19-23, 2014); 5 pages; RAN WG1 #76bis, Seoul, Korea; (Agenda 6.2.5.2.1).
LG Electronics; "Issues on Multiplexing of WAN and D2D"; 3GPP TSG R1-141354; (Mar. 31-Apr. 4, 2014); 10 pages; RAN WG1 Meeting #76bis, Shenzhen, China; Agenda 7.2.7.2.2.
LG Electronics; "Considerations on Supporting Inter-Cell D2D Operations"; 3GPP TSG R1-142161; (May 19-23, 2014); 3 pages; RAN WG1 Meeting #77, Seoul, Korea; Agenda 6.2.5.3.3.

* cited by examiner

RESOURCE ALLOCATION AND UE BEHAVIOR FOR D2D SYNCHRONIZATION SIGNAL TRANSMISSION FOR INTER-CELL D2D DISCOVERY

BACKGROUND

In a cellular radio access network such as an evolved universal mobile telecommunications system terrestrial radio access network (E-UTRAN), mobile devices can wirelessly communicate with each other through one or more network nodes, such as evolved node Bs (eNBs). In addition, proximity-based services that facilitate direct communication between mobile devices are also available in some wireless networks.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1A:
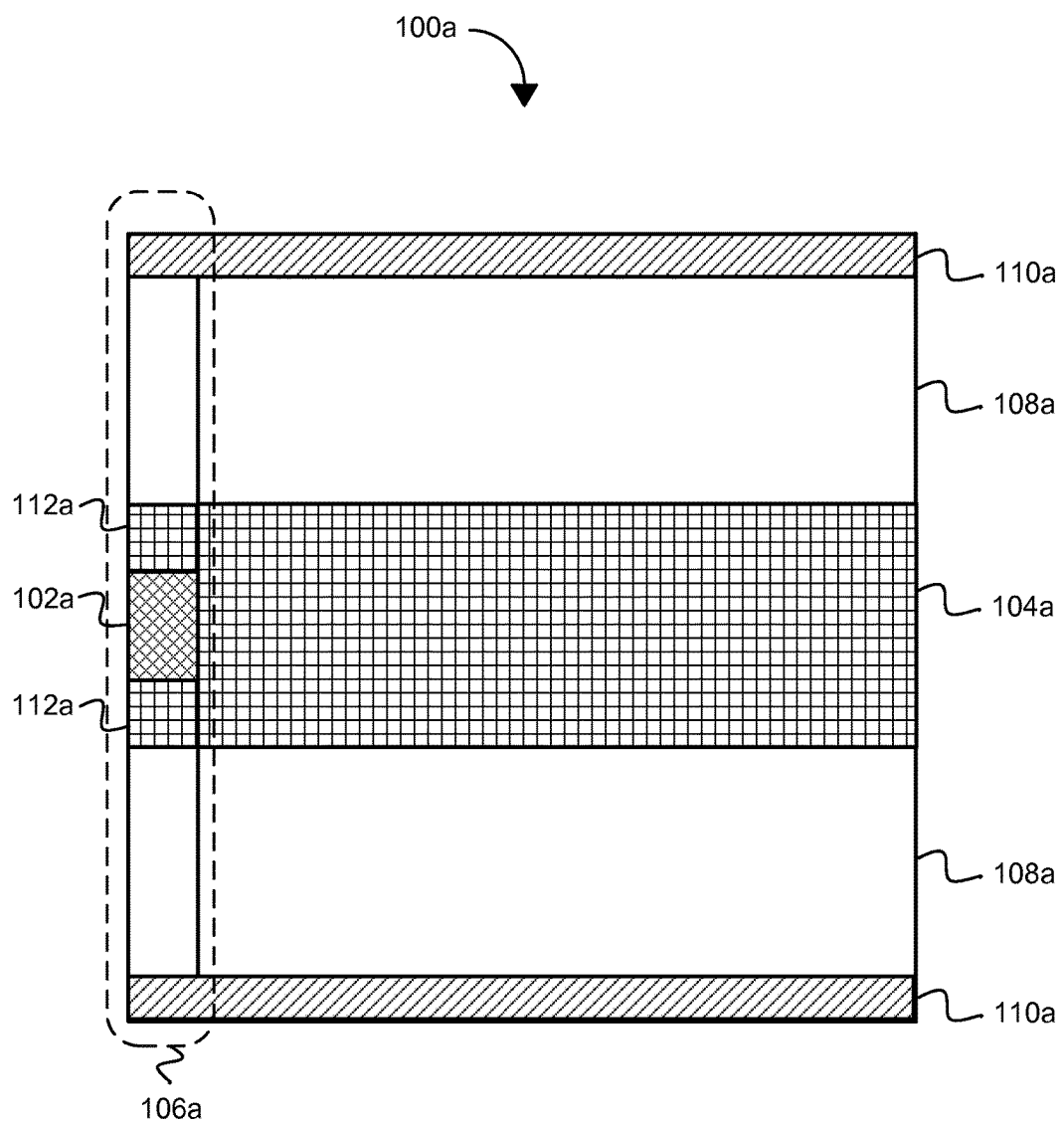
FIG. 1a illustrates a transmission-resource pool in which the six central PRBs in the first sub-frame completely overlap with a discovery-resource pool in accordance with an example.

Reference will now be made to the exemplary embodiments illustrated and specific language will be used herein to describe the same. It will nevertheless be understood that no limitation of the scope of is thereby intended.

DETAILED DESCRIPTION

Before some embodiments are disclosed and described, it is to be understood that the claimed subject matter is not limited to the particular structures, process operations, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology nor is it intended to limit the scope of the claimed subject matter.

For Third-Generation-Partnership-Project (3GPP) Long-Term-Evolution (LTE) release 12 (and likely for future releases), it has been agreed that certain types of device-to-device (D2D) discovery will be supported within network coverage areas. Specifically, inter-cell direct D2D discovery is to be supported in both synchronous and asynchronous networks. Since cells in an asynchronous network can use non-identical timing and frequency resources, a user equipment (UE) connected to or camping on a first cell and a second UE connected to or camping on an asynchronous second cell need some way of identifying and/or synchronizing a pool of time and frequency resources in order to communicate with each other via D2D signaling. It has been agreed by the Radio-Access-Network-1 (RAN1) Working Group (WG) that UEs in asynchronous networks can derive time and frequency synchronization and determine the exact location of the resource pools configured in neighboring cells from a combination of: (1) neighbor-cell resource-pool-configuration signaling forwarded by a serving cell (for UEs in radio-resource-control connected (RRC_CONNECTED) mode) or by a camping cell (for UEs in radio-resource-control idle (RRC_IDLE) mode) via system-information-block (SIB) signaling; and (2) D2D synchronization signals (D2DSSs) sent by UEs in the neighboring cell. A D2DSS comprises a primary D2D synchronization signal (PD2DSS) that is a Zadoff Chu sequence (i.e., a ZC sequence) and can also comprise a secondary D2D synchronization signal (SD2DSS) that is a maximal-length sequence (i.e., an M sequence). Note that D2DSS, PD2DSS and SD2DSS are also referred to as Sidelink Synchronization Signal (SSS), Primary Sidelink Synchronization Signal (PSSS), and Secondary Sidelink Synchronization Signal (SSSS), respectively. As used herein, a UE transmits discovery signals at time T=T1−T2, where T1 is the reception timing of a D2DSS transmitted by a D2D Synchronization Source that a UE uses as the timing reference and equals to the DL reception timing of the serving or camping cell for UEs within network coverage. T2 is an offset which is positive, negative, or zero.

At least two types of D2D discovery procedures have been defined by the by the RAN1 WG. In Type 1, resources for discovery-signal transmission are allocated on a non-UE-specific basis; resources can be allocated for all UEs or for a group of UEs. In Type 2, resources for discovery-signal transmission are allocated on a per-UE-specific basis. At least two sub-types of Type 2 have also been defined: Type 2A (resources are allocated for each specific transmission instance of discovery signals) and Type 2B (resources are semi-persistently allocated for discovery signal transmission). Note that discovery signal or message transmission is also referred to by the transmission of the Physical Sidelink Discovery CHannel (PSDCH) in the 3GPP specifications.

With regard to Type 1 discovery, in Frequency-Division-Duplex (FDD) mode (a mode of bidirectional communication in which transmission and reception take place at the same time on different carrier frequencies), the RAN1 WG has agreed that UEs in RRC_CONNECTED mode transmit discovery signals based on downlink (DL) reference timing (T2=0). In Time-Division-Duplex (TDD) mode (A mode of bidirectional communication in which transmissions in each direction take place on the same carrier frequency but in different time slots), the RAN1 WG has agreed that UEs in RRC_CONNECTED mode and RRC_IDLE mode transmit discovery signals based on reference timing T2=624 Ts.

With regard to Type 2B discovery, for UEs in RRC_Connected mode that transmit Type 2B discovery signals, if UEs in in RRC_Idle mode are not able to transmit type 2B discovery signals, the value of T2 may be, for example, between: T2=an active Timing-Advance (TA) value for FDD mode and T2=624 Ts+TA for TDD mode; and T2=0 for FDD mode and 624 Ts for TDD mode. On the other hand, if UEs in in RRC_Idle mode are able to transmit type 2B discovery signals, the value of T2 may be, for example, T2=0 for FDD mode and 624 Ts for TDD mode.

In addition, the RAN1 WG has also agreed that the D2DSS-transmission configuration is to be the same for both D2D discovery and D2D communication if the network supports both D2D discovery and D2D communication. For Type 1 discovery, UEs in a cell can transmit PD2DSS and SD2DSS during the first sub-frame of the transmission-resource pool within a discovery period. If the transmission-resource pool is configured by an evolved node B (eNB) using a system-information-block (SIB) broadcast, then the PD2DSS sequence and the SD2DSS sequence for a given transmission are also configured using the SIB broadcast and the same PD2DSS and SD2DSS sequences are used for D2D communication. If the transmission-resource pool is not configured using a SIB broadcast, the PD2DSS and SD2DSS sequences can be configured using dedicated radio-resource-control (RRC) signaling. For type 2B discovery, the eNB can instruct one or more UEs to transmit PD2DSS and SD2DSS sequences.

The RAN1 WG has also agreed that the PD2DSS and the SD2DSS for the discovery transmissions in the first sub-frame of a transmission-resource pool occupy the central six physical resource blocks (PRBs) of the uplink (UL) system bandwidth (BW). These central six PRBs may overlap with a discovery-resource pool, the discovery-resource pool comprising a subset of resources in the transmission-resource pool. For systems with larger system bandwidth (e.g., 50 PRBs for a system with 10 MHz bandwidth or 100 PRBs for a system with 20 MHz bandwidth), there is not yet an agreed-upon manner in which to use remaining PRBs in the first sub-frame of the discovery-resource pool (i.e., PRBs other than the central six PRBs that are in the first sub-frame of the discovery-resource pool).

On the one hand, the non-central PRBs could be left unused; this would ensure that there would be no interference on received D2DSS transmissions in the central PRBs due to in-band emissions (IBEs) from transmissions in the remaining PRBs. However, this approach would also lead to a waste of the available spectrum at the system level. Hence, there is a need to specify how any remaining PRBs in the first sub-frame of the discovery-resource pool will be used in order to avoid wasting available spectrum resources.

There is also a need to define additional rules for D2DSS transmissions when multiple discovery-resource pools are allocated in a frequency-division multiplexing (FDM) manner, such as rules identifying the reference timing to be used and determining which UEs will transmit a given D2DSS.

Examples in accordance with the present disclosure provide rules for resource allocation in the first sub-frame of a discovery-resource pool that is a subset of a transmission-resource pool wherein the central six PRBs are used for D2DSS. Additional examples provide timing options for D2DSS transmissions between UEs in communication with asynchronous network deployments. For example, if a first UE is in a first cell and a second UE is in a second cell and the second cell uses timing that is asynchronous with the timing of the first cell, the two cells are associated with asynchronous network deployments. The first UE and the second UE can establish D2D communications with each other by using D2DSSs.

Additional examples provide rules for D2DSS transmissions when type 1 and type 2B discovery-resource pools are allocated in an FDM manner Although some examples are explained in relation to inter-cell D2D-discovery support, the concepts illustrated in the rules for resource allocation in the first sub-frame of a discovery-resource pool can also be applied to support inter-cell D2D communication by associating the D2DSS transmissions with the scheduling-assignment (SA) resource pool, also referred to as the Physical Sidelink Control CHannel (PSCCH), configured for D2D communication.

In some of the following examples, discovery-resource pools are illustrated as contiguous blocks of time and frequency resources. The frequency range of a discovery-resource pool can extend from a value specified in a first parameter (startPRB) to the value of a second parameter (endPRB), wherein startPRB and endPRB are communicated to UEs via SIB signaling. However, a single discovery-resource pool can also comprise two or more separate blocks within a transmission-resource pool. Where a discovery-resource pool comprises more than one separate block of resources, additional parameters can be added to the SIB signaling in order to communicate the starting and ending frequency values that define the additional blocks of resources. For example, if there are two separate resource blocks that define a single discovery-resource pool, startPRB and endPRB can be used to define the frequency range of the first block, while two additional parameters (e.g., startPRB2 and endPRB2) can be used to define the frequency range of the second block.

In some of the following examples (e.g., examples described in option 3), it is assumed that the configuration of a discovery-resource pool is the same in the first sub-frame (i.e., sub-frame #0) of a transmission-resource pool as the configuration of the discovery-resource pool in subsequent sub-frames (i.e., sub-frame #1 through sub-frame #N−1, where the transmission-resource pool spans N sub-frames). However, it is also possible to use a first configuration of the discovery-resource pool in the first sub-frame and a second configuration in subsequent sub-frames of the same transmission-resource pool. For example, if a transmission-resource pool is configured such that the six central PRBs in the first sub-frame are used for D2DSS, the configuration of the discovery-resource pool in the first sub-frame can be considered to include only the six central PRBs. For subsequent sub-frames, the configuration of the discovery-resource pool be considered to include the frequency range(s) specified by startPRB and endPRB (and startPRB2 and endPRB2, etc., where applicable). If the transmission-resource pool is not configured such that the six central PRBs in the first sub-frame are used for D2DSS, the same configuration (e.g., a configuration whose frequency ranges are defined by startPRB and endPRB) can be applied to all sub-frames of the transmission-resource pool. The concept of having different configurations for the first sub-frame versus subsequent sub-frames can be used, for example, to help implement the approaches of option 1 and option 2 (described below).

Resource Allocation for the First Sub-Frame of a D2D Discovery-Resource Pool when One or More D2D Discovery-Resource Pools are Allocated Using Time-Division Multiplexing (TDM) at the System-Level: Option 1

In option 1, remaining PRBs (i.e., PRBs other than the six central PRBs in the transmission-resource pool that are used for D2DSS) in the first sub-frame of the discovery-resource pool can be left unused. As explained above, this option results in a system-level spectrum-efficiency loss in the UL direction. However, it also avoids the interference on received D2DSS transmissions in the central PRBs that would potentially be caused by in-band emissions (IBEs) from transmissions in the remaining PRBs.

Resource Allocation for the First Sub-Frame of a D2D Discovery-Resource Pool when One or More D2D Discovery-Resource Pools are Allocated Using Time-Division Multiplexing (TDM) at the System-Level: Option 2

In option 2, remaining PRBs (i.e., PRBs other than the six central PRBs in the transmission-resource pool that are used for D2DSS) in the first sub-frame of the discovery-resource pool can be allocated for normal wide-area-network (WAN) transmission. In this case, an eNB can schedule regular physical-uplink-shared-channel (PUSCH) transmission for normal UEs. Compared to the approach of option 1, this approach would have a minimal impact WAN transmission. In addition, the eNB can also reduce interference on D2DSS transmissions due to IBE by applying appropriate power control when scheduling UEs that are close to the eNB.

Resource Allocation for the First Sub-Frame of a D2D Discovery-Resource Pool when One or More D2D Discovery-Resource Pools are Allocated Using Time-Division Multiplexing (TDM) at the System-Level: Option 3

In option 3, remaining PRBs (i.e., PRBs other than the six central PRBs in the transmission-resource pool that are used for D2DSS) in the first sub-frame of the discovery-resource pool can be allocated for discovery-signal transmission. In order to reduce interference on D2DSS transmissions due to IBE, a separate set of parameters (e.g., P0 and alpha parameters) for D2D-discovery-signal open-loop power control can be applied to restrict the transmission power when the remaining PRBs are used for discovery-signal transmission.

FIG. 1a illustrates an exemplary transmission-resource pool 100a in which the six central PRBs 102a in the first sub-frame 106a of the transmission-resource pool 100a completely overlap with the discovery-resource pool 104a. The discovery-resource pool 104a may be of type 1 or of type 2B. WAN resources 108a and physical-uplink-control-channel (PUCCH) resources 110a are also shown in transmission-resource pool 100a. The horizontal axis of the transmission-resource pool 100a represents time, while the vertical axis of the transmission-resource pool 100a represents frequency. The remaining PRBs 112a can be used for discovery transmission. When configuring the discovery-resource pool 104a, an eNB may need to specify that the discovery-resource pool includes the central six PRBs 102a. In addition, for the remaining PRBs 112a, a UE may be configured to not employ the repeated transmission for D2D discovery.

Figure 1B:
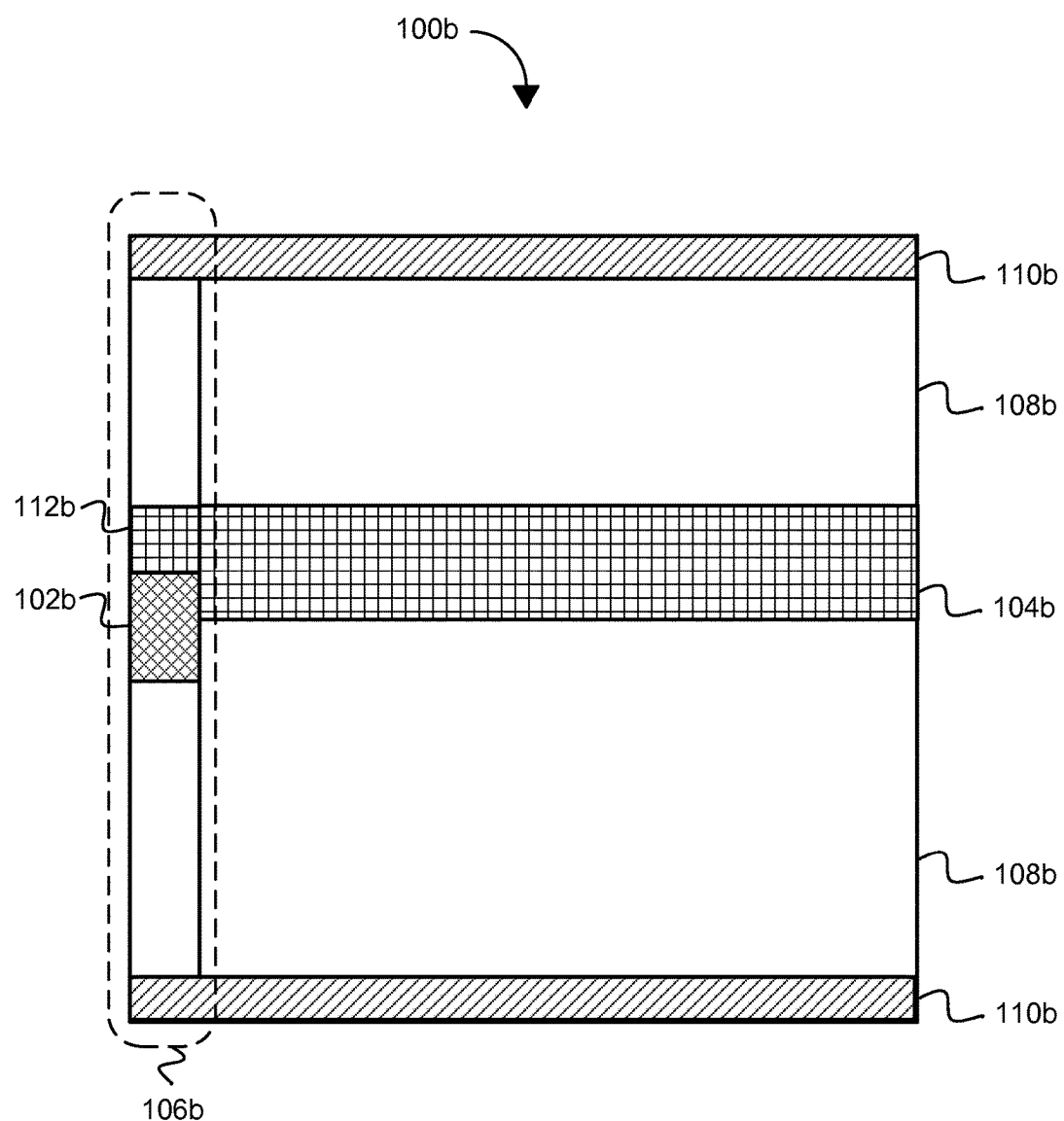
FIG. 1b illustrates a transmission-resource pool in which the six central PRBs in the first sub-frame partially overlap with a discovery-resource pool in accordance with an example.

FIG. 1b illustrates an exemplary transmission-resource pool 100b in which the six central PRBs 102b in the first sub-frame 106b of the transmission-resource pool 100b partially overlap with the discovery-resource pool 104b. The discovery-resource pool 104b may be of type 1 or of type 2B. WAN resources 108b and physical-uplink-control-channel (PUCCH) resources 110b are also shown in transmission-resource pool 100b. The horizontal axis of the transmission-resource pool 100b represents time, while the vertical axis of the transmission-resource pool 100b represents frequency. The remaining PRBs 112b can be used for discovery transmission. When configuring the discovery-resource pool 104b, an eNB may need to specify that the discovery-resource pool includes the central six PRBs 102b. In addition, for the remaining PRBs 112b, a UE may be configured to not employ the repeated transmission for D2D discovery.

Figure 2:
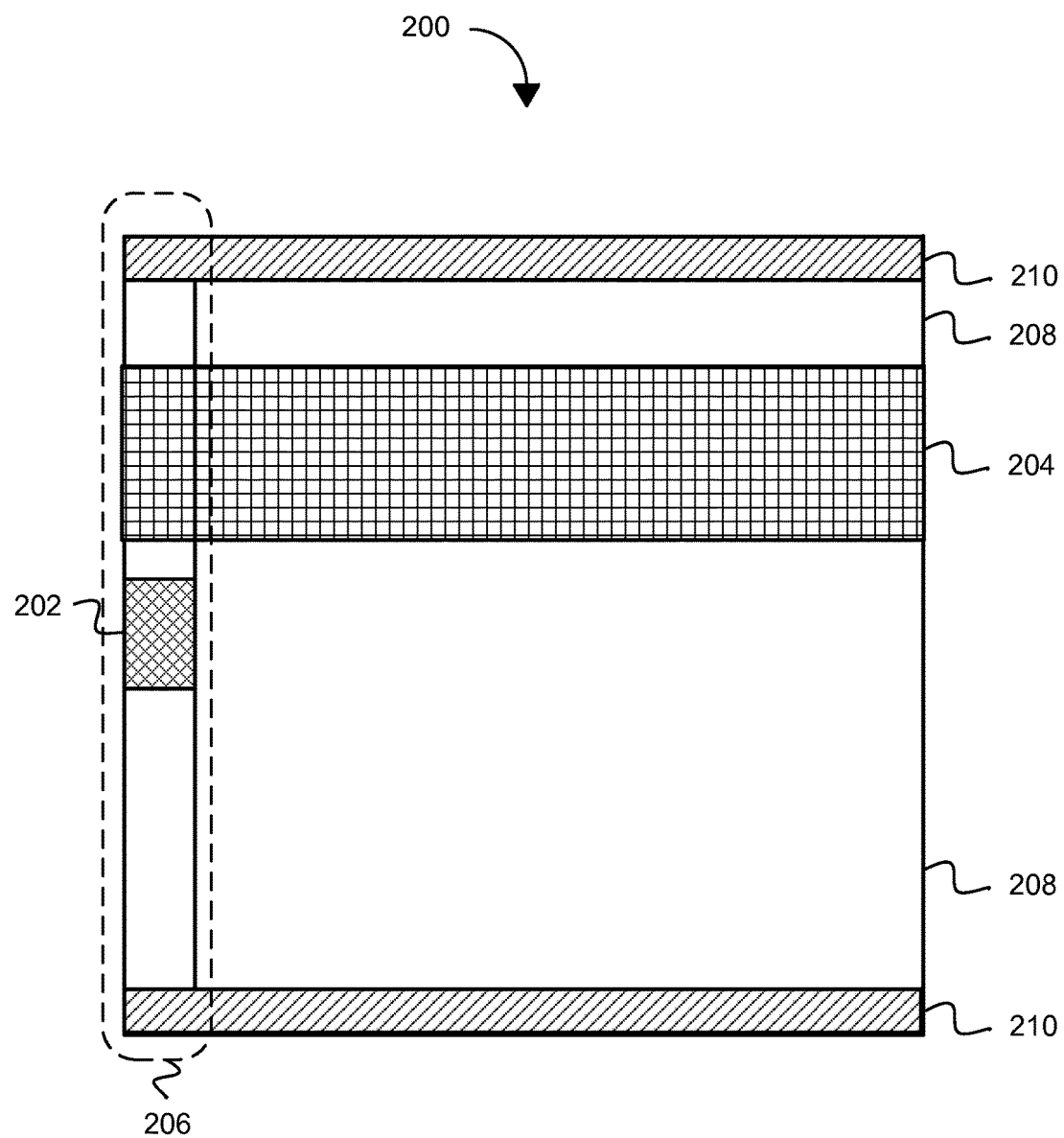
FIG. 2 illustrates a transmission-resource pool in which the six central PRBs 202 in the first sub-frame of a transmission-resource pool do not overlap with a discovery-resource pool in accordance with an example.

FIG. 2 illustrates an exemplary transmission-resource pool 200 in which the six central PRBs 202 in the first sub-frame 206 of the transmission-resource pool 200 do not overlap with the discovery-resource pool 204. The discovery-resource pool 204 may be of type 1 or of type 2B. WAN resources 208 and physical-uplink-control-channel (PUCCH) resources 210 are also shown in transmission-resource pool 200. The horizontal axis of the transmission-resource pool 200 represents time, while the vertical axis of the transmission-resource pool 200 represents frequency. Since the discovery-resource pool 204 and the six central PRBs 202 do not overlap, the central six PRBs can be used for D2DSS and all resources in the discovery-resource pool 204 in the first sub-frame 206 can be allocated for discovery transmission.

Figure 3:
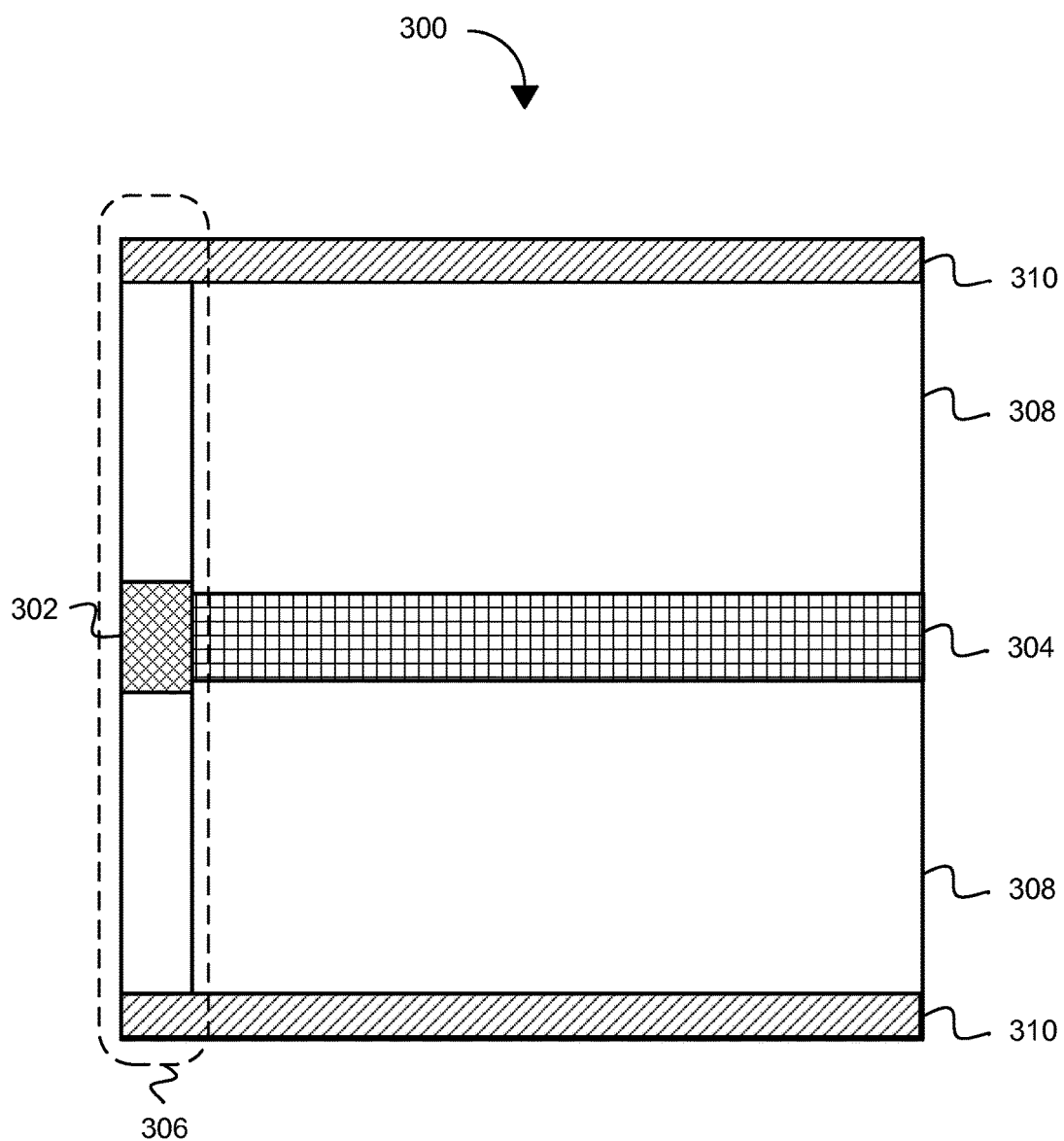
FIG. 3 illustrates a transmission-resource pool in which the PRBs in a discovery-resource pool that are in the first sub-frame of a transmission-resource pool are also in the six central PRBs in accordance with an example.

FIG. 3 illustrates an exemplary transmission-resource pool 300 in which the only PRBs in a discovery-resource pool 304 that are in the first sub-frame 306 of the transmission-resource pool 300 are also in the six central PRBs 302. The discovery-resource pool 304 may be of type 1 or of type 2B. WAN resources 308 and physical-uplink-control-channel (PUCCH) resources 310 are also shown in transmission-resource pool 300. The horizontal axis of the transmission-resource pool 300 represents time, while the vertical axis of the transmission-resource pool 300 represents frequency. In this case, D2DSS can still be transmitted in the six central PRBs 302. PRBs in the discovery-resource pool 304 that are in sub-frames other than the first sub-frame 306 can be allocated for D2D discovery transmission.

Figure 4:
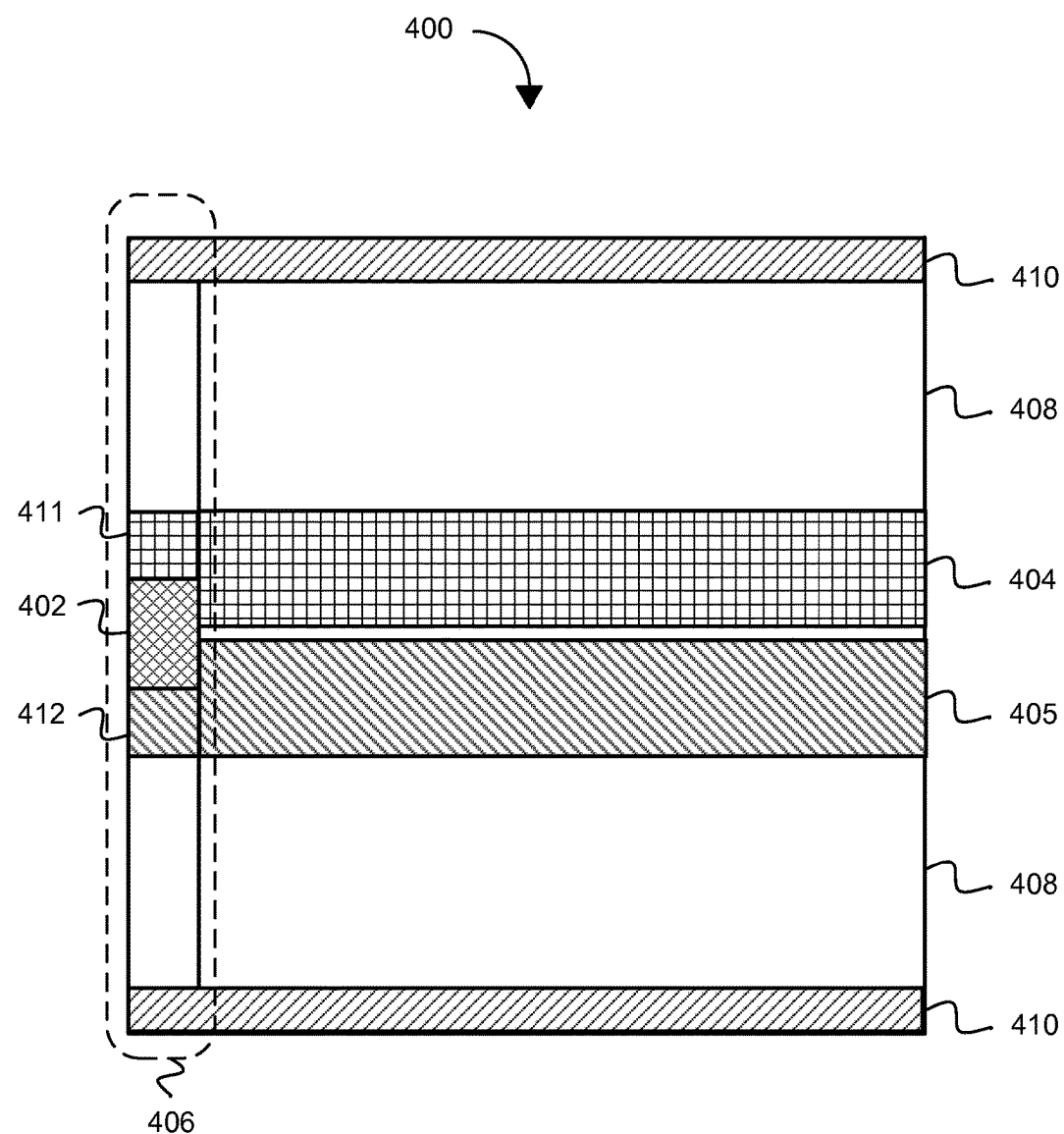
FIG. 4 illustrates a transmission-resource pool in which the six central PRBs in the first sub-frame overlap with both a type-1 discovery-resource pool and a type 2B discovery-resource pool in accordance with an example.

FIG. 4 illustrates an exemplary transmission-resource pool 400 in which the six central PRBs 402 in the first sub-frame 406 of the transmission-resource pool 400 overlap with both a type-1 discovery-resource pool 404 and a type 2B discovery-resource pool 405. WAN resources 408 and physical-uplink-control-channel (PUCCH) resources 410 are also shown in transmission-resource pool 400. The horizontal axis of the transmission-resource pool 400 represents time, while the vertical axis of the transmission-resource pool 400 represents frequency. In this case, remaining PRBs 411 in the type-1 discovery-resource pool 404 that are in the first sub-frame 406 of the transmission-resource pool 400 can be allocated for type-1 D2D-discovery transmissions. In addition, remaining PRBs 412 in the type-2B discovery-resource pool 405 that are in the first sub-frame 406 of the transmission-resource pool 400 can be allocated for type-2B D2D-discovery transmissions.

When multiple discovery-resource pools, that may either be type 1 or type 2B discovery-resource pools, are allocated in an FDM manner, resource schemes similar to those illustrated in FIGS. 1a-4 can be used.

D2DSS Transmission Timing for D2D Discovery in Asynchronous Deployments when Type-1 and Type-2B Discovery-Resource Pools are Allocated in a TDM Manner When the six central PRBs in the first sub-frame of a transmission-resource pool overlap with a type-1 discovery-resource pool that is allocated in a TDM manner, D2DSSs that are transmitted in the six central PRBs can simply follow the transmission timing for type-1 discovery (e.g., by being based on DL reference timing). When the six central PRBs in the first sub-frame of a transmission-resource pool overlap with a type-2B discovery-resource pool that is allocated in a TDM manner, D2DSSs that are transmitted in the six central PRBs can follow the transmission timing for type-2B discovery or can be fixed to follow DL- or UL-reference timing. For a UE with an active timing advance (TA) configuration, the UL reference=DL reference timing+TA.

D2DSS Transmission Timing for D2D Discovery in Asynchronous Deployments when Type-1 and Type-2B Discovery-Resource Pools that are Allocated in an FDM Manner When the six central PRBs in the first sub-frame of a transmission-resource pool overlap with a type-1 or type-2B discovery-resource pool that is allocated in an FDM manner, there are at least two different timing alternatives that can be used. These alternatives are partly motivated by the observation that following a single reference timing for all D2DSS transmissions within a cell would improve detection performance when multiple UEs attempt to transfer D2DSSs in a single-frequency-network (SFN) fashion.

In alternative 1, a D2DSS can be transmitted based on DL reference timing regardless of the transmission timing used for discovery signal transmission (e.g., regardless of whether the discovery-resource pool is of type 2B and uses UL- or DL-reference timing). Accordingly, a type-2B transmitter UE, if instructed to transmit a D2DSS (either explicitly by a serving eNB or according to some pre-defined criterion), can transmit a D2DSS following DL timing if the type-2B transmitter UE is aware of a type-1 discovery-resource pool that is multiplexed with a type-2B discovery-resource pool via FDM. Alternatively, a serving eNB can explicitly communicate the timing to be used for D2DSS transmission as part of the resource-pool configuration (e.g., by indicating whether a TA is to be applied for D2DSS transmission).

In alternative 2, D2D UEs with an active TA configuration (e.g., UEs in RRC_CONNECTED mode with an active TA configuration) can transmit D2DSSs based on UL-reference timing. This alternative is reasonable if the UEs are also configured to transmit type-2B discovery signal transmissions using UL-reference timing.

To provide configurability between alternative 1 and alternative 2, it can be specified that UEs in RRC_IDLE mode using type-1 discovery-resource pools will follow DL-reference timing for D2DSS transmissions. It can also be specified that UEs in RRC_CONNECTED mode with an active TA will follow the transmission timing associated with the type-2B discovery-signal transmission for D2DSS transmissions unless the UEs are explicitly configured by the serving eNB to use DL-reference timing for D2DSS transmissions or are configured to infer that DL-reference timing should be used for D2DSS transmissions based on the presence of an FDM-multiplexing of type-1 and type-2B discovery-resource pools.

D2DSS Transmission Rules that can be Used when Type-1 and Type-2B Discovery-Resource Pools are Allocated in an FDM Manner When type-1 and type-2B discovery-resource pools are allocated in an FDM manner, rules are needed to determine which UEs will transmit D2DSSs. The following examples provide explanations of several different types of rules that may be applied. The rules of the following examples can be used individually or in combination.

In one example, a rule can be applied such that only UEs that are configured by a serving eNB will transmit a D2DSS signal. The serving eNB can instruct the UEs to transmit a D2DSS signal via RRC signaling. UEs that are instructed to transmit the D2DSS signal can be RRC_CONNECTED UEs participating in D2D discovery. In addition, UEs that are instructed to transmit the D2DSS signal can be RRC_IDLE UEs that may be paged by the eNB serving the camping cell.

In another example, UEs in RRC_CONNECTED mode or RRC_IDLE mode can be configured to autonomously transmit a D2DSS signal based on certain predetermined criteria without requiring any explicit instruction from the eNB. A UE can measure the reference signal received power (RSRP) from the serving eNB (and possibly from other eNBs) and calculate a path loss. The path loss and/or RSRP can be compared to a threshold value configured by the eNodeB in order to determine whether a pre-configured criterion has been met. When the pre-configured criterion is met, the UE can transmit a D2DSS. Optionally, a UEs decision to send a D2DSS can be overridden by an instruction from the eNB of the serving/camping cell.

In another example, UEs can report a path-loss measurement (or some other related measurement) to an eNB. The eNB can use the measurement received from the UE to determine whether or not the UE (and possibly other UEs) should transmit a D2DSS. The eNB can then use UE-specific signaling to instruct the UE to transmit a D2DSS, when applicable. The UE can be in RRC_CONNECTED mode and participating in D2D discovery. The UE can also be in RRC_IDLE mode and be paged by the eNB of the camping cell to report the path-loss measurement (or related measurement). In addition, if the UE is in RRC_IDLE mode, the UE can also be paged by the eNB of the camping cell to report metrics that are used in mobility management procedures; the eNB can also use these metrics to determine a set of UEs that will be instructed to transmit D2DSSs.

If specified UE behavior is different when type-1 and type-2B discovery-resource pools are multiplexed via FDM versus when type-1 and type-2B discovery-resource pools are multiplexed via TDM, the eNB can communicate the difference via explicit eNB signaling as part of the transmission-resource-pool configuration. Alternatively, UEs can be configured to infer the difference based on the presence of FDM between type-1 and type-2B discovery-resource pools.

Figure 5:
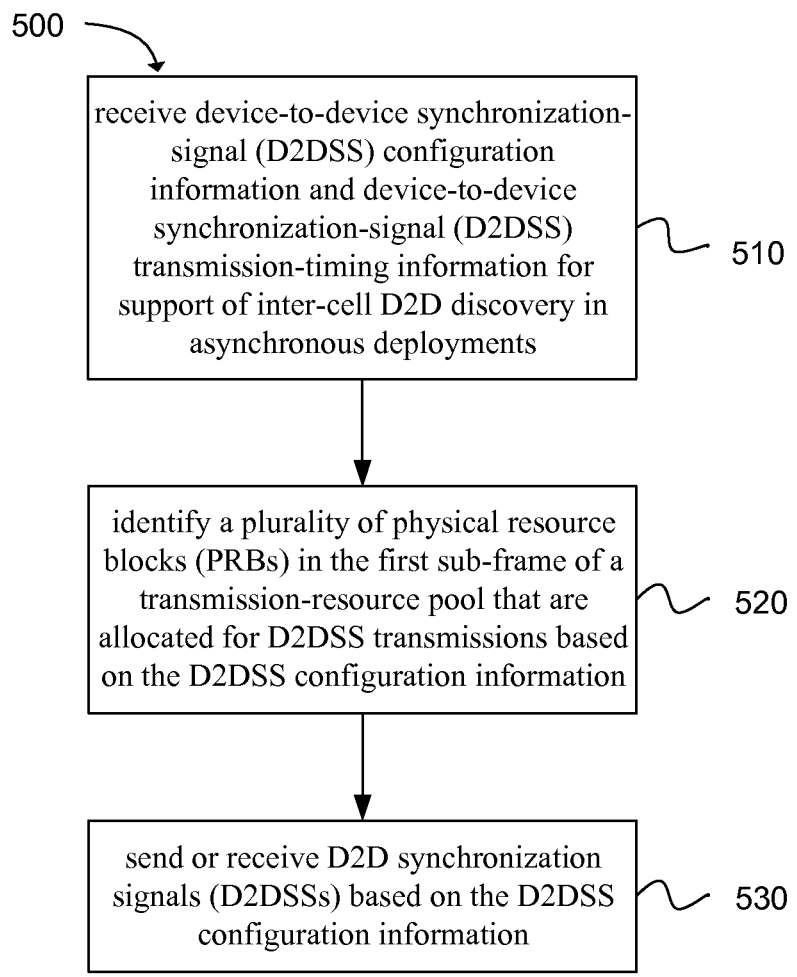
FIG. 5 illustrates exemplary functionality of a UE operable to perform D2D communications in accordance with an example.

FIG. 5 illustrates exemplary functionality 500 of an apparatus of a UE operable to perform D2D communications. The functionality can be implemented as a method or the functionality can be executed as instructions on a machine, where the instructions are included on at least one non-transitory computer-readable storage medium. As in block 510, circuitry at the UE can receive device-to-device synchronization-signal (D2DSS) configuration information and device-to-device synchronization-signal (D2DSS) transmission-timing information for support of inter-cell D2D discovery in asynchronous deployments. The circuitry at the UE can comprise, for example, one or more processors (e.g., baseband processors and application processors), one or more transceivers in communication with the one or more baseband processors, and one or more antennas. In some embodiments, the circuitry at the UE can also comprise separate modules, such as a transceiver module and a processing module. The D2DSS configuration information and the D2DSS transmission-timing information can be wirelessly received via the antennas. The antennas can be part of, or can be in communication with, a transceiver module at the UE. In some embodiments, the transceiver module can provide the D2DSS configuration information and the D2DSS transmission-timing information to one or more processors at the UE.

As in block 520, circuitry at the UE, (e.g., a processing module) comprising the one or more processors can identify a plurality of physical resource blocks (PRBs) in the first sub-frame of a transmission-resource pool that are allocated for D2DSS transmissions based on the D2DSS configuration information. The plurality of PRBs can comprise the six central PRBs in the first sub-frames of the transmission-resource pool. The transmission-resource pool can also comprise a D2D-discovery-resource pool. Resources in the D2D-discovery-resource pool may be allocated in a time-division-multiplexing (TDM) manner or a frequency-division-multiplexing (FDM) manner. Resources in the D2D-discovery-resource pool can be allocated on a non-UE-specific basis (type 1) or allocated semi-persistently on a UE-specific basis (type 2B).

The plurality of PRBs can overlap with the D2D-discovery-resource pool. PRBs in the first sub-frame of the D2D-discovery-resource pool that are not included in the plurality of PRBs that are allocated for D2DSS transmissions can be allocated for WAN transmission or D2D-discovery transmission.

As in block 530, the circuitry at the UE (e.g. transceiver(s) coupled to baseband processor(s)) can send or receive D2D synchronization signals (D2DSSs) (e.g., via antennas and a transceiver module) based on the D2DSS configuration information. In cases where resources in the D2D-discovery-resource pool are allocated in a TDM manner, the circuitry at the UE can send D2D synchronization signals (D2DSSs) (e.g., via a transceiver module) based on downlink (DL) reference timing or Type-2B transmission timing. In cases where resources in the D2D-discovery-resource pool are allocated in an FDM manner, the circuitry at the UE can send D2DSSs (e.g., via a transceiver module) based on downlink (DL) reference timing or uplink (UL) reference timing.

Furthermore, in cases where resources in the D2D-discovery-resource pool are allocated in an FDM manner, the circuitry at the UE can calculate (e.g., using a processing module comprising one or more processors) a measurement, such as a reference-signal-received-power (RSRP) or a path-loss, and determine whether a D2DSS should be sent by the UE based on the measurement. The circuitry at the UE can then send a make a determination of whether a D2DSS should be sent based on a comparison between the measurement and a threshold value. Alternatively, the circuitry at the UE can also send the measurement to an eNB (e.g., via a transceiver module). The eNB can then determine whether the UE is to send a D2DSS based on the measurement and send an override instruction to the UE comprising the determination. In cases where both approaches to determining whether the UE should send a D2DSS are used, the override instruction from the eNB can supersede the determination made by the circuitry at the UE.

Figure 6:
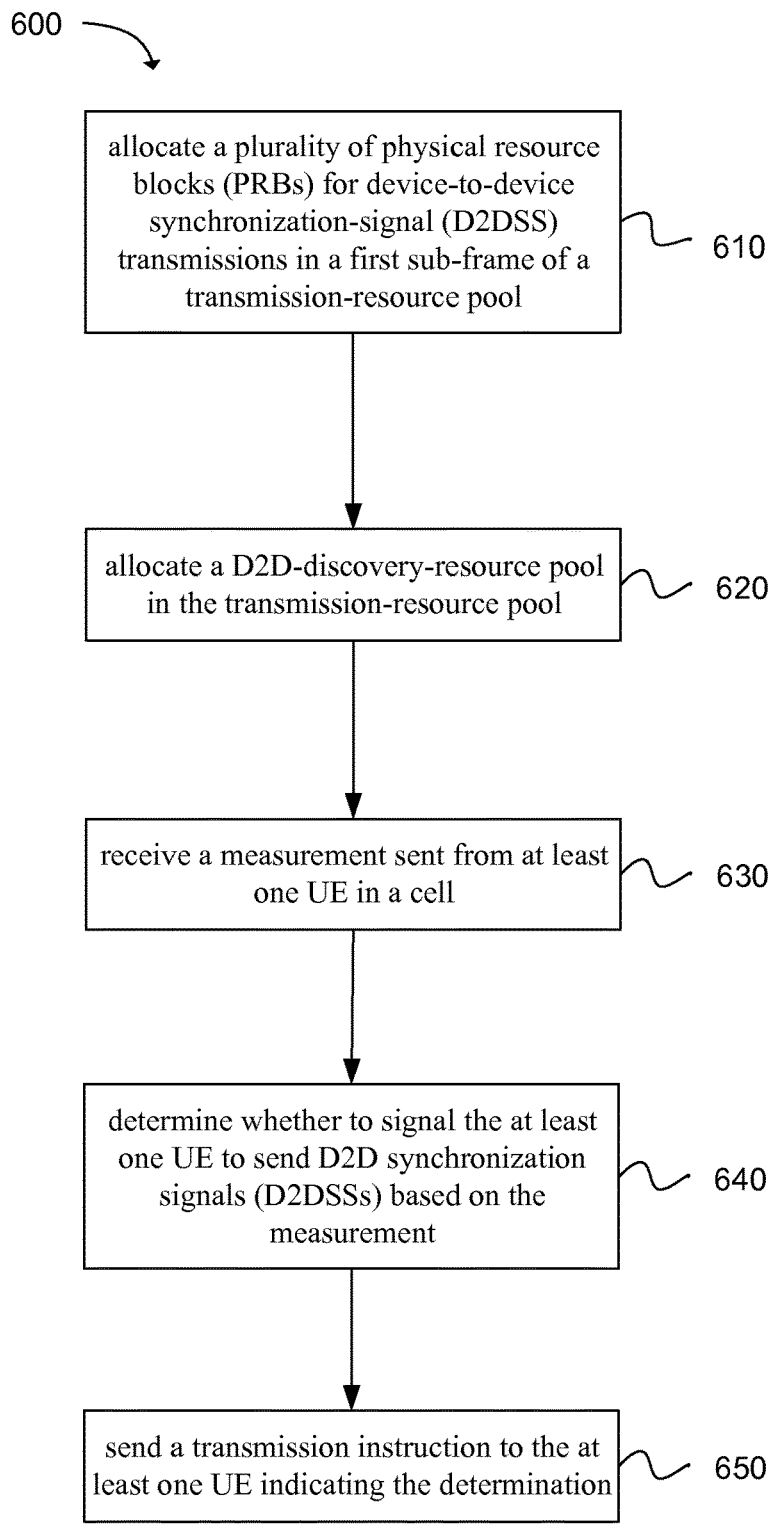
FIG. 6 illustrates exemplary functionality of a cellular base station in accordance with an example.

FIG. 6 illustrates exemplary functionality 600 of a cellular base station. The functionality can be implemented as a method or the functionality can be executed as instructions on a machine, where the instructions are included on at least one non-transitory computer-readable storage medium. As in 610, circuitry at a cellular base station (e.g., a processing module comprising one or more processors) can allocate a plurality of physical resource blocks (PRBs) for device-to-device synchronization-signal (D2DSS) transmissions in a first sub-frame of a transmission-resource pool. As in 620, circuitry at the cellular base station (e.g., a processing module comprising one or more processors) can allocate a D2D-discovery-resource pool in the transmission-resource pool. As in 630, circuitry at the cellular base station (e.g., a processing module comprising one or more processors) can receive a measurement sent from at least one UE in a cell (e.g., a cell served by the cellular base station). As in 640, circuitry at the cellular base station (e.g., a processing module comprising one or more processors) can determine (i.e., make a determination of) whether to signal the at least one UE to send D2D synchronization signals (D2DSSs) based on the measurement. The measurement can comprise a reference-signal-received-power (RSRP) or a level of path loss. In some examples, the circuitry can determine whether to signal the at least one UE to send D2DSSs based on a comparison between the measurement and a threshold value. As in 650, circuitry at the cellular base station (e.g., a transceiver module comprising a transceiver in communication with one or more antennas) can send a transmission instruction to the at least one UE indicating the determination.

Figure 7:
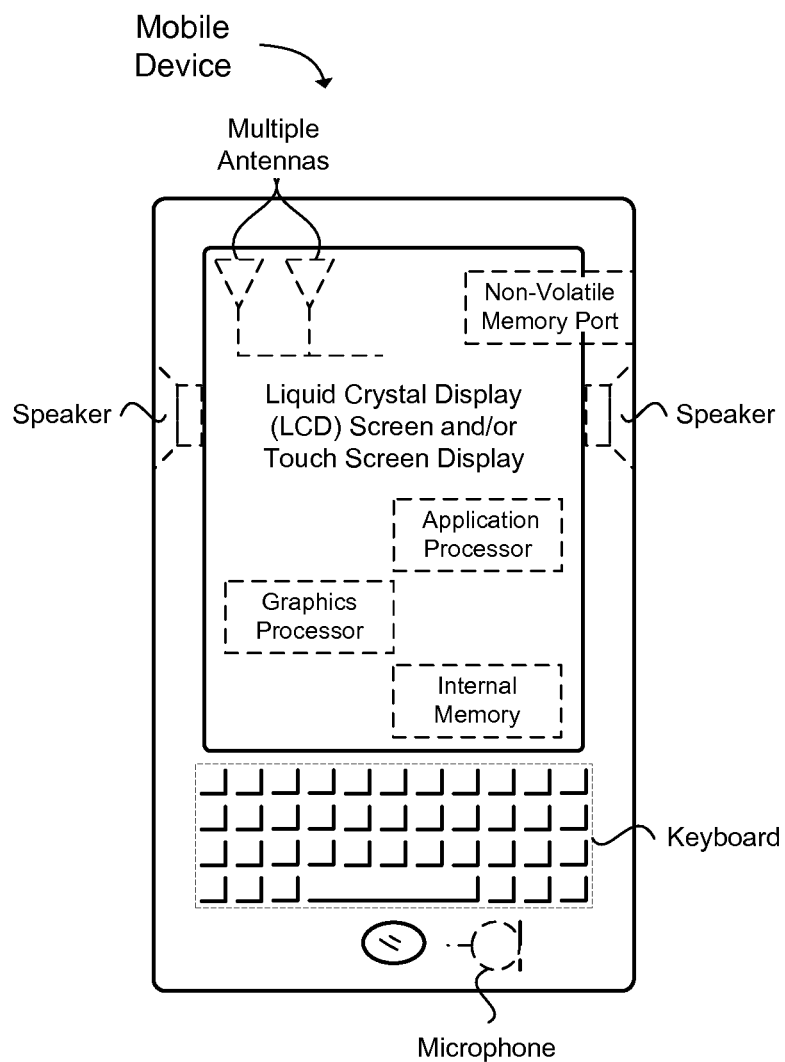
FIG. 7 illustrates a diagram of a wireless device (e.g., UE) in accordance with an example.

FIG. 7 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the word "or" indicates an inclusive disjunction. For example, as used herein, the phrase "A or B" represents an inclusive disjunction of exemplary conditions A and B. Hence, "A or B" is false only if both condition A is false and condition B is false. When condition A is true and condition B is also true, "A or B" is also true. When condition A is true and condition B is false, "A or B" is true. When condition B is true and condition A is false, "A or B" is true. In other words, the term "or," as used herein, should not be construed as an exclusive disjunction. The term "xor" is used where an exclusive disjunction is intended.

As used herein, the term processor can include general-purpose processors, specialized processors such as VLSI, FPGAs, and other types of specialized processors, as well as base-band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

Reference throughout this specification to "an example" means that a particular feature, structure, or characteristic described in connection with the example is included in at least one embodiment of the present disclosure. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present disclosure can be referred to herein along with alternatives for the various components thereof. It is understood that such embodiments, examples, and alternatives are not to be construed as de facto equivalents of one another, but are to be considered as separate and autonomous representations of the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the disclosure. One skilled in the relevant art will recognize, however, that the embodiments of the disclosure can be practiced without one or more of the specific details, or with other methods, components, layouts, etc. In other instances, well-known structures, materials, or operations are not shown or described in detail to avoid obscuring aspects of the disclosure.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

What is claimed is:

1. An apparatus of a user equipment (UE) operable to perform sidelink discovery in a wireless network, the apparatus comprising:
    one or more processors configured to:
        decode, at the UE, configuration information received from an evolved universal mobile telecommunications system terrestrial radio access network (E-UTRAN), wherein the configuration information is to be used for, in part, sidelink direct discovery at the UE; and
        encode, at the UE, a sidelink synchronisation signal (SLSS) discovery message for transmission to a second UE in a selected subframe based on the configuration information when a reference signal received power (RSRP) for a serving cell of the UE in the E-UTRAN is less than a defined threshold value, wherein the selected subframe is a first subframe of a transmission resource pool that is allocated for SLSS transmissions based on the configuration information; and memory configured to store the configuration information received from the E-UTRAN.

2. The apparatus of claim 1, further comprising a transceiver configured to:
receive, at the UE, the configuration information from the E-UTRAN; and
transmit the SLSS discovery message to the second UE.

3. The apparatus of claim 1, wherein the one or more processors are further configured to decode a system information block (SIB) received from the E-UTRAN, wherein the SIB includes the defined threshold value.

4. The apparatus of claim 1, further comprising a transceiver configured to decode the configuration information received from the E-UTRAN via dedicated signaling or via a broadcast.

5. The apparatus of claim 1, wherein the one or more processors are further configured to determine to not transmit the SLSS discovery message in the selected subframe when the UE uses the selected subframe for another uplink transmission.

6. The apparatus of claim 1, wherein the one or more processors are further configured to encode the SLSS discovery message for transmission to the second UE based on a downlink reference timing.

7. The apparatus of claim 1, wherein the UE includes an antenna, a touch sensitive display screen, a speaker, a microphone, a graphics processor, an application processor, an internal memory, a non-volatile memory port, a transceiver, or combinations thereof.

8. An apparatus of an eNodeB operable to assist a user equipment (UE) with sidelink discovery in a wireless network, the apparatus comprising:
one or more processors configured to:
encode, at the eNodeB, configuration information for transmission to the UE, wherein the configuration information is for sidelink direct discovery at the UE, wherein the configuration information enables the UE to perform the sidelink discovery when a reference signal received power (RSRP) for a serving cell of the UE is less than a defined threshold value based on a selected subframe, wherein the selected subframe is a first subframe of a transmission resource pool that is allocated for sidelink synchronisation signal (SLSS) transmissions based on the configuration information; and
memory configured to store the configuration information for transmission to the UE.

9. The apparatus of claim 8, further comprising a transceiver configured to transmit the configuration information to the UE.

10. The apparatus of claim 8, wherein the one or more processors are further configured to encode a system information block (SIB) for transmission to the UE, wherein the SIB includes the defined threshold value.

11. The apparatus of claim 8, wherein the one or more processors are further configured to encode the configuration information for transmission to the UE via dedicated signaling.

12. The apparatus of claim 8, wherein the one or more processors are further configured to encode the configuration information for transmission to the UE via a broadcast.

13. At least one non-transitory machine readable storage medium having instructions embodied thereon for performing sidelink discovery at a user equipment (UE) in a wireless network, the instructions when executed by one or more processors cause the UE to perform the following:
decoding, at the UE, configuration information received from an evolved universal mobile telecommunications system terrestrial radio access network (E-UTRAN), wherein the configuration information is for sidelink direct discovery at the UE; and
encoding, at the UE, a sidelink synchronisation signal (SLSS) discovery message for transmission to a second UE in a selected subframe based on the configuration information when a reference signal received power (RSRP) for a serving cell of the UE in the E-UTRAN is less than a defined threshold value, wherein the selected subframe is a first subframe of a transmission resource pool that is allocated for SLSS transmissions based on the configuration information.

14. The at least one non-transitory machine readable storage medium of claim 13, further comprising instructions which when executed by the one or more processors cause the UE to perform the following: decoding a system information block (SIB) received from the E-UTRAN, wherein the SIB includes the defined threshold value.

15. The at least one non-transitory machine readable storage medium of claim 13, further comprising instructions which when executed by the one or more processors cause the UE to perform the following: decoding the configuration information received from the E-UTRAN via dedicated signaling or via a broadcast.

16. The at least one non-transitory machine readable storage medium of claim 13, wherein the selected subframe is an available subframe that is nearest to a first subframe of a transmission resource pool that is allocated for SLSS transmissions based on the configuration information.

17. The at least one non-transitory machine readable storage medium of claim 13, further comprising instructions which when executed by the one or more processors cause the UE to perform the following: determining to not transmit the SLSS discovery message in the selected subframe when the UE uses the selected subframe for another uplink transmission.

18. The at least one non-transitory machine readable storage medium of claim 13, further comprising instructions which when executed by the one or more processors cause the UE to perform the following: encoding the SLSS discovery message for transmission to the second UE based on a downlink reference timing.

* * * * *